Jan. 5, 1954

R. O. SCHRUM 2,664,682

STONE PICKER

Filed July 11, 1949

Inventor

Ray O. Schrum

By Clarence A. O'Brien
and Harvey B. Jacobson
Attorneys

Jan. 5, 1954

R. O. SCHRUM 2,664,682

STONE PICKER

Filed July 11, 1949

Inventor

Ray O. Schrum

By *Clarence A. O'Brien and Harvey B. Jacobson*
Attorneys

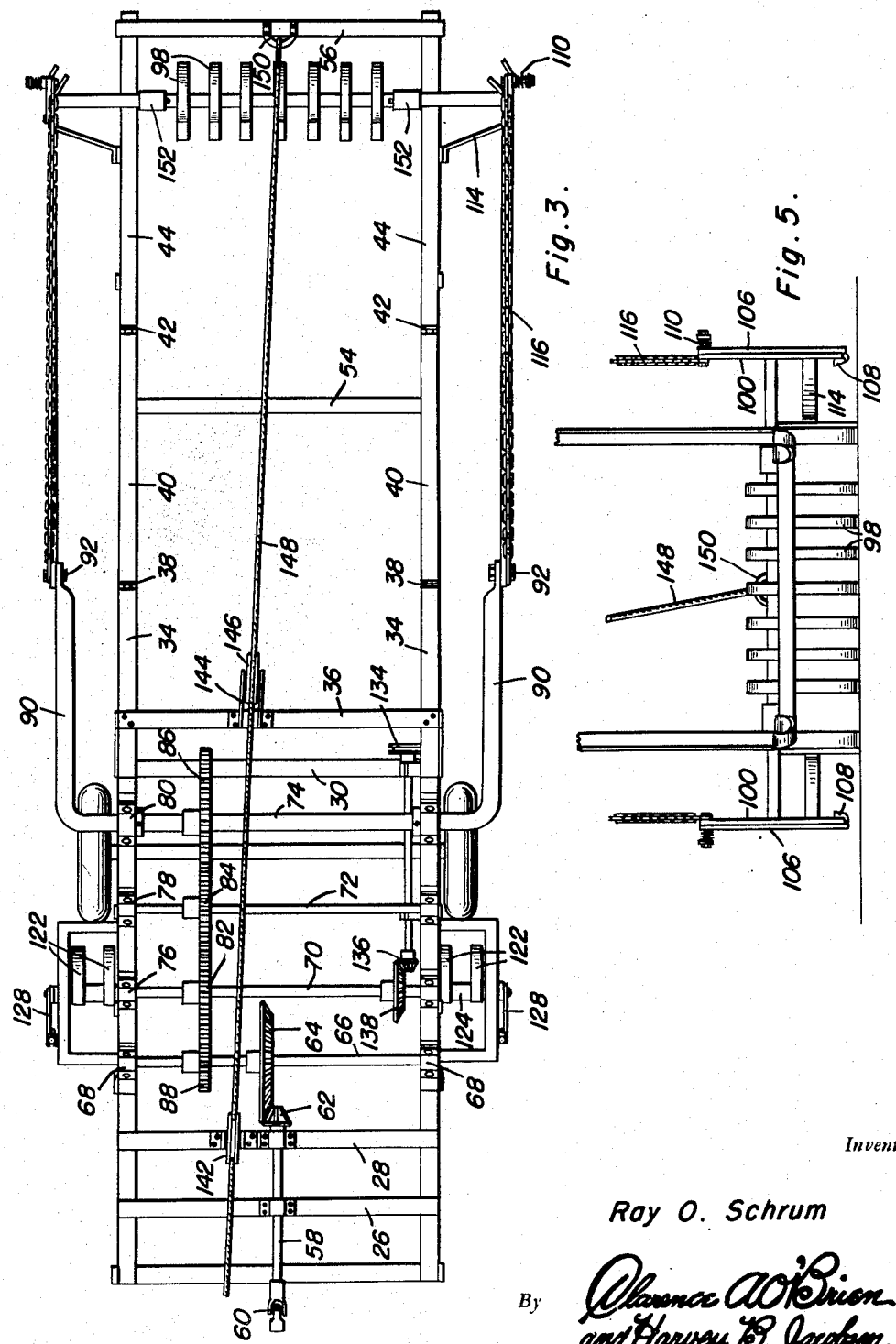

Jan. 5, 1954
R. O. SCHRUM
2,664,682
STONE PICKER
Filed July 11, 1949
4 Sheets-Sheet 4
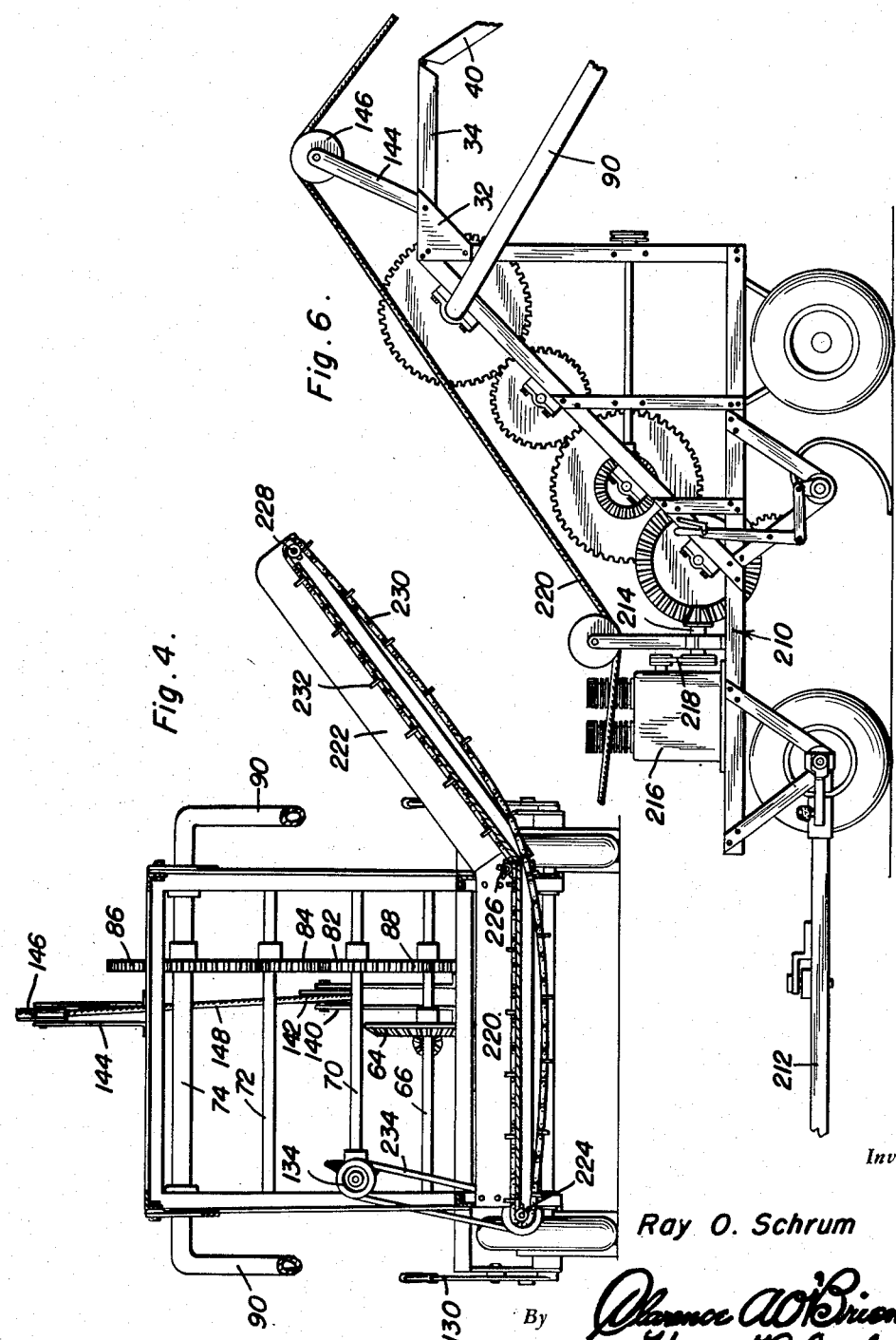
Inventor
Ray O. Schrum
By Clarence A. O'Brien and Harvey B. Jacobson
Attorneys Patented Jan. 5, 1954

2,664,682

UNITED STATES PATENT OFFICE 2,664,682

STONE PICKER

Ray O. Schrum, West Fork, Mo.

Application July 11, 1949, Serial No. 104,108

13 Claims. (Cl. 55—17)

This invention comprises novel and useful improvements in a stone picker, and more specifically pertains to an apparatus for collecting, gathering and removing stones, rocks and the like from the ground for disposal of the same.

The principal object of this invention is to provide an improved apparatus for efficiently collecting, gathering and removing stones and rocks from the ground.

A further object of the invention is to provide an apparatus in accordance with the foregoing object which shall be particularly efficacious in delivering the collected and gathered stones to retainers or receptacles for convenient disposal of the same.

A still further object of the invention is to provide an apparatus in conformity with the foregoing objects which shall be automatic in its operation, portable in nature, and which may be either self-propelled and self-powered or attached to and powered by a tractor or other towing vehicle.

These, together with various ancillary features and objects of the invention which will later become apparent as the following description proceeds, are attained by the present invention, preferred embodiments of which have been illustrated by way of example only in the accompanying drawings, wherein:

Figure 3 is a top plan view of the embodiment shown in Figures 1 and 2;

Figure 4 is a vertical transverse sectional view through a modified construction of the invention;

Figure 5 is a rear elevational view showing the construction of the stone gathering element of the invention;

Figure 6 is a side elevational view of a portion of the embodiment shown in Figure 4;

Figure 7 is an enlarged fragmentary vertical sectional detail view with parts broken away of the mounting of the stone picking rake axle on the stone gathering element.

Figure 1:
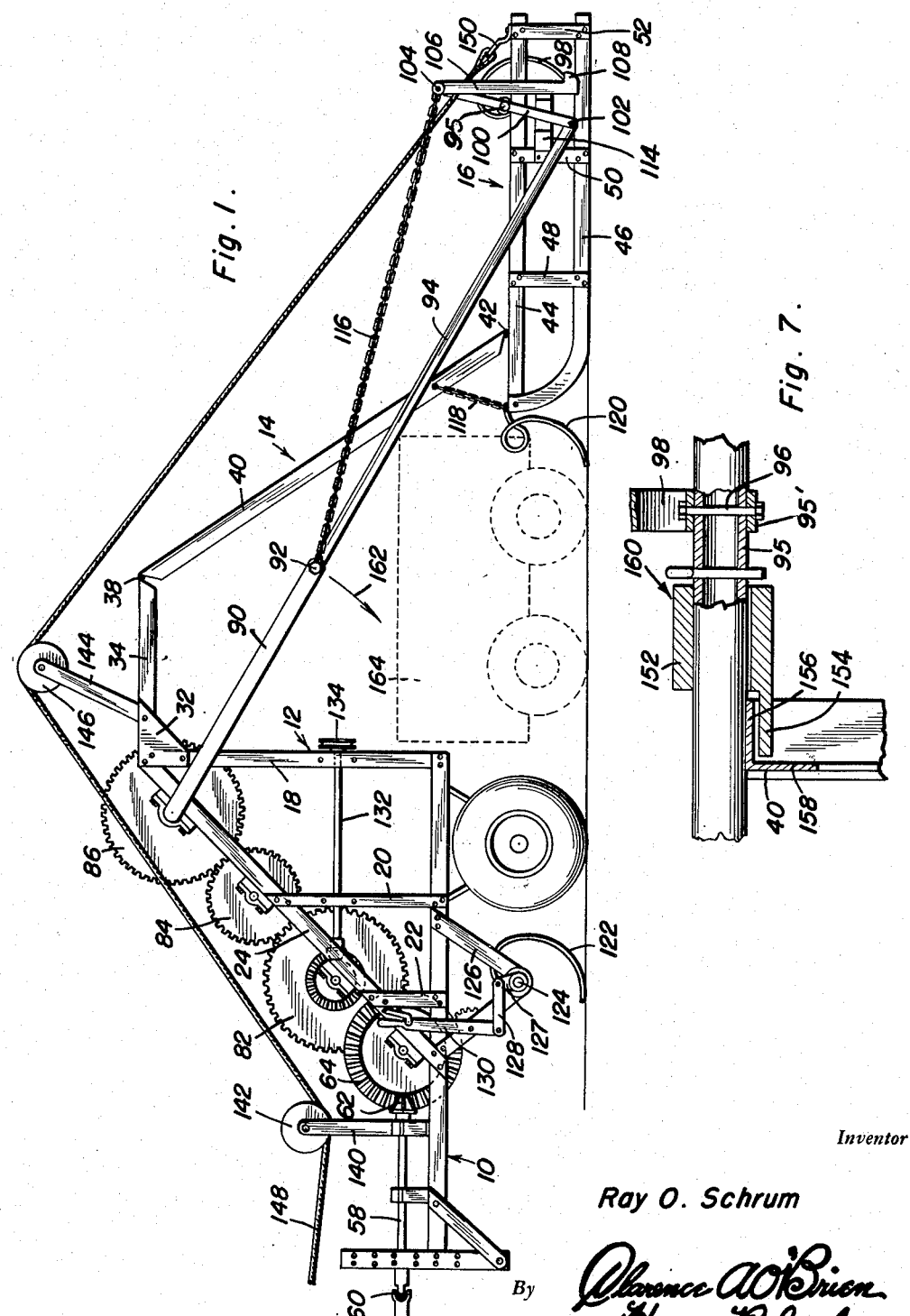
Figure 1 is a side elevational view of a satisfactory embodiment of the invention, a portable stone receiving receptacle being indicated in dotted lines therein.
Figure 2:
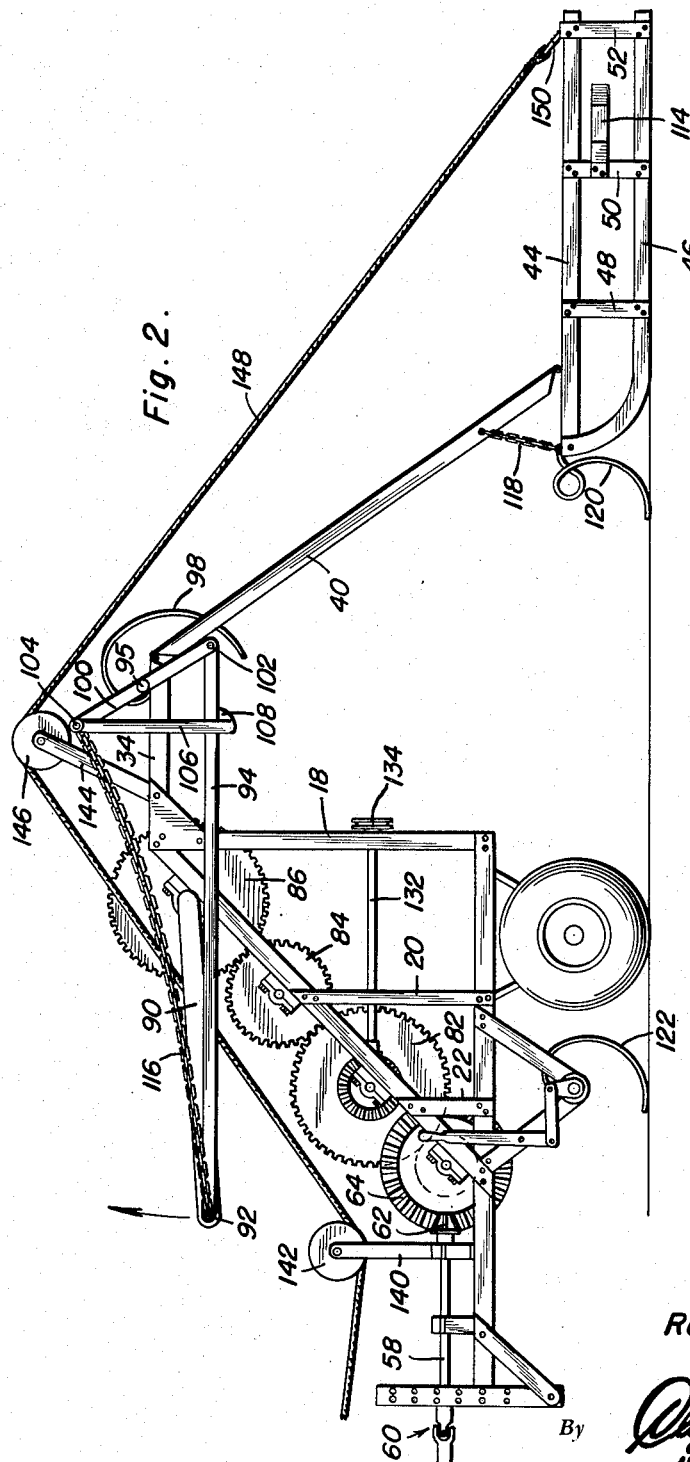
Figure 2 is a view similar to Figure 1 but with the parts of the apparatus being shown in a different position during their operation.

Referring now more specifically to the accompanying drawings, wherein like numerals designate similar parts throughout the various views, attention is directed first to the embodiment of Figures 1-3, wherein the numeral 10 designates generally a wheeled support which may conveniently comprise a trailer adapted for attachment in any suitable manner to a tractor or other towing vehicle, this support having mounted thereon a supporting framework indicated generally by the numeral 12 and of any conventional design and construction, to which framework is pivotally attached the inclined track 14 which, at its lower end, is hingedly connected to a sled, indicated generally by the numeral 16.

For convenience of illustration, the supporting frame 12 has been illustrated as consisting of vertical members 18, 20 and 22 disposed on each side of the wheel support 10, and connected at their upper extremities to each other and to the wheel support 10, as by inclined side rails 24. Transverse brace members 26, 28 and 30 extend between the side rails 24 for rigidly connecting the same. Supported from the upper ends of the vertical members 18 and rigidly attached thereto as by gusset plates 32 are a pair of rearwardly extending members 34 having a transverse reinforcing member 36. At their outer extremities, the members 34 are hinged or pivoted, as at 38, to downwardly inclined members 40, which at their lower ends are hinged as at 42 to horizontally extending members 44 forming the side rails of the sled 16. The latter includes side runners or skids 46 which support the horizontal rails 44, as by vertical members 48, 50 and 52, suitable transverse reinforcing members 54 and 56 being provided at the front and rear ends of the sled.

As set forth hereinafter, the horizontal rails 44 of the sled, the inclined rails 40 and the horizontal rails 34 fixedly carried by the wheeled support, constitute a pair of tracks upon which is rotatably and slidably secured a rake assembly by means of which the stones are gathered, collected, elevated and discharged, as set forth hereinafter.

The wheeled support is adapted to be connected or coupled to a tractor of any conventional design or any other towing vehicle in any desired manner, and to derive its power therefrom. For the latter purpose, a drive shaft 58 is journaled upon the wheeled support and is adapted at its forward end to be connected to the power take-off of a tractor or towing vehicle, as by a universal joint coupling 60, this shaft having a bevel gear 62 at its rearward end adapted to mesh with a ring gear 64 secured to a transverse shaft 66, mounted in suitable bearings 68 on the side rail members 24. Similar parallel shafts 70, 72 and 74 are journaled upon the side rails by bearings 76, 78 and 80, respectively, these shafts having gears 82, 84 and 86 respectively, all connected to each other, the gear 82 being driven by a similar gear 88 carried by the shaft 66.

The shaft 74 has its extremities extending beyond the side rails 24 and provided with integral or, if desired, rigidly attached crank arms 90, which are pivotally connected, as at 92, to connecting rods 94, the crank arms and connecting rods being disposed outwardly from the sides of the wheeled support, the frame, and the inclined tracks of the device.

The rake assembly consists of a tubular shaft 95, which is provided with a series of longitudinally spaced apertures 95' (Figure 7) for the reception of fastening bolts 96 by means of which rake teeth 98, in the form of flat, spiral steel strips, may be secured in laterally or longitudinally adjusted position. The extremities of the tubular shaft 95 which constitutes an axle extend beyond the sides of the sled and have rigidly secured thereto levers 100, the levers being attached at their mid-points to the shaft 95, and at their lower ends being pivotally connected, as at 102, to the extremities of the connecting rods 94, while the other extremities of the levers 100 are pivoted as at 104 to straps 106 constituting latch members and having laterally extending latch dogs 108. Suitable springs 110 carried by the pivot members 104 serve to urge the latch members 106 firmly against the lever 100, as will be apparent from Figure 5.

The latch members 106 are of such length that the dogs 108 are capable of engagement beneath the under surface of the connecting rods 94 upon proper rotation of the lever 100 and axle 95, this latch engaging position being shown in Figure 2.

Rigidly secured to and extending laterally from the members 50 of the sled 16 are outwardly and rearwardly extending brackets 114 which constitute cams adapted to engage the latch dogs 108 and press the same outwardly with respect to the lever 100 to thereby release the dogs from their latching engagement with the connecting rods 94 as set forth hereinafter.

A chain 116 is provided, connected between the pins 92 and 104, to limit relative rotation of the lever 100 with respect to the connecting rod 94 and its pivot pin 102, the chain being indicated in its rotational limiting position in Figure 1.

Additional chains 118 are suitably attached to the inclined track rails 40 and to the front ends of the sled 16 to limit relative rotation of the sled with respect to the inclined rails about the pivot pins 42, as set forth hereinafter.

Suitable spring teeth 120 are attached to the sled 16 at the front portion thereof, in position to scrape the surface of the ground when the apparatus is being towed, the teeth being so positioned as to engage and direct stones and rocks encountered by the sled toward the center thereof, where the same may be collected by the rake assembly, as set forth hereinafter. These teeth 120 are particularly disposed in advance of the sled runners 46 to prevent the same from striking stones or rocks during the travel of the device. Similar teeth for a similar purpose, indicated at 122, are secured to a transverse shaft 124, journaled in suitable supports 126 attached to and depending from the wheeled support 10, this shaft being oscillatable by crank arms 127 connected to links 128 attached to operating levers 130, by means of which the shaft 124 may be rocked and the teeth 122 may be elevated into an inoperative position, as desired.

A power take-off shaft 132 is suitably journaled in the supporting frame 12 and is provided with a power take-off pulley 134 at its rear end extending rearwardly of the frame member 18, and at its front end is provided with a bevel gear 136 which meshes with a driving bevel 138 fixedly secured to the above mentioned shaft 70. By this means, power may be delivered from the gearing assembly mounted upon the wheeled support for any desired purpose, including the actuation of an elevator conveyor as illustrated in the embodiment of Figures 4 and 6.

Rigidly attached to the reinforcing cross beam 26 is a standard 140 upon which is journaled a pulley 142 at its upper end, and a similar standard 144 is mounted on the cross beam 36 for journaling a pulley 146 thereon. A cable 148 is entrained over the under side of the pulley 142 and over the top surface of the pulley 146, and at its rear end is attached to a fastener 150 secured to the rear cross member 56 of the sled. The front end of the cable 148 may be attached to a suitable towing vehicle. It will now be apparent that when power is applied to the end of the cable 148, as by a winch or the like, the reeling end of the cable first serves to pivot the sled in a counter-clockwise direction about its hinge 42 so that the sled is folded backwardly upon the inclined track 40; and thereafter the inclined track itself is elevated in a counterclockwise direction about its hinge or pivot 38, to thereby raise the sled and the inclined tracks from the ground so that the device may be conveniently and readily transported or maneuvered, as desired.

Reference is now made more particularly to Figure 7 wherein it will be seen that the rake axle 95 is provided with a guide and retaining member consisting of a bushing or sleeve 152 which is loosely received upon the axle 95, and which is provided with an outwardly extending lug or finger 154, this finger adapted to underlie and slidingly engage the under surface of the upper flange 156 inside of the depending flange 158 of the angle iron track members 44, 40, and 34, so that as the axle is slid along these track members and rests thereon, the retaining sleeves will slide upon the flanged surfaces of the track and retain the rake assembly thereon. The sleeve members themselves 152 are prevented from axial disengagement from the tracks by means of retaining pins 160 extending through the tubular axle 95 and forming inner abutments or stops for the sleeve members.

The operation of the device, as so far described, is as follows: With the parts in the position shown in Figure 1, the rake is in what may be termed its "rest" or initial position, so that as the crank arms 90 are rotated in the clockwise direction indicated by the arrow 162 in Figure 1, the chain 116 and the connecting rods 94 will both impart a pull upon the axle 95 of the rake, to cause the same to move toward the left, as viewed in Figure 1. The chain is of such length that the lever 100 will assume the position shown in Figure 1, and cause the teeth 98 to be in the position shown in that figure, with the point of the teeth just engaging the ground so that the teeth now scrape along the ground as the axle is moved forward. During the first part of the forward movement of the axle, the same rides upon the horizontal rails 44 of the sled, thus scraping any stones or rock upon the surface of the ground between the sled skids 46, and any stones which are deposited therebetween by the teeth 122 or 120. As will be apparent, during this first portion of the movement of the rake, the retaining sleeve 152 and the finger 154 retain the axle 95 upon the rails 44.

Continued rotation of the crank arms 90, and hence forward movement of the chains 116 and connecting rods 94 now cause the axle to move up the inclined rails 40 until the axle moves over the top of the same and upon the horizontal rails 34 at the top of the track. Just prior to the start of this upward travel of the axle upon the inclined rails 40, it will be seen that the direction of the thrust or pull of the connecting rods 94 is now in a plane inclined to the horizontal plane, so that the entire thrust or forward pull upon the axle is applied by the rods 94, the chain 116 being now relieved of its tension, so that the axle is turned in a clockwise direction by means of the lever arm 100, thereby causing a clockwise rotation of the teeth 98, which thus scoop up the stones which have been collected or gathered in the forward travel of the teeth upon the ground, and, upon further rotation of arms 90 and travel of rods 94, thus elevate these teeth up the inclined track 40 to the horizontal track 34.

It may be here noted that a wheeled cart, truck, or other container 164 may be disposed between the inclined rails 40, the supporting frame members 18 and the horizontal rails 34 beneath the rake teeth in their elevated position.

After the crank arm 90 passes its horizontal position on the far side of the crank axle 74 from the rake assembly, in substantially the position shown in Figure 2, its continued downward travel now imparts a thrust toward the right as the connecting rods begin their return travel. This thrust now rotates the lever 100 in a counter-clockwise direction, similarly rotating the rake teeth and turning the same in a position to permit discharge of the rocks collected thereby into the container 164 therebeneath. Continued movement of the crank arm and connecting rod now serve to push the axle and the rake assembly toward the right, down the inclined track and along the horizontal track back to the original position.

However, it should be noted that during this upward travel, as soon as the lever 100 has reached a vertical position, the dog 108 on the latch lever 106 will engage under the connecting rod 94, and will move inwardly thereof as this connecting rod assumes a horizontal position, until the position shown in Figure 2 is reached. After the connecting rod has assumed the horizontal position shown in Figure 2, with the rake in its dumped position, the latch dog 108 will engage beneath the connecting rods 94 to retain the rake in its dumped position, as the rake is pushed toward its original position. However, as the rake passes the latch release cam 114, the lateral projection of the same will strike the dogs 108, and push the same out of engagement with the connecting rods 94, thus permitting the teeth to assume their loading position upon the next forward movement of the connecting rods.

Figure 8:
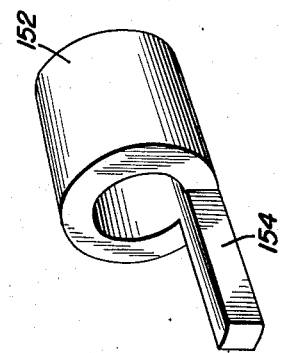
Figure 8 is an enlarged perspective view of one of the elements indicated in Figure 7.

Attention is next directed to the embodiment illustrated in Figures 4 and 6, it being understood that the constructions of Figures 5, 7 and 8 are employed therein. In this arrangement, a wheeled support 210 is provided with a drawbar 212 whereby the same may be attached to any suitable towing vehicle, the trailer illustrated in these figures being completely self-supported.

The identical gearing assembly described in connection with the preceding embodiment is mounted upon this wheeled support, and detailed description of the same is believed to be unnecessary. However, the driving shaft 214 of the same, instead of being coupled to a power take-off of a tractor or towing vehicle, is attached to a gasoline or any other suitable prime mover indicated at 216 and mounted upon the wheeled support 210, by means of a suitable belt and pulley connection 218, whereby power mounted upon the trailer itself may be employed to manipulate the stone picker mechanism. It will, of course, be understood that any suitable means may be provided for actuating the cable 220, whereby the sled and inclined track may be elevated as desired.

However, in this form of the invention, in place of the wheeled receptacle 164, it is preferred to provide a mechanical elevating conveyor for receiving the stones discharged by the rake assembly and for delivering the same into a truck or to any other suitable source, not shown. For this purpose, there is secured to the rear end of the trailer 210 the side frame members of an endless elevating conveyor, one such frame member being indicated at 220, this member having an upwardly inclined extension 222. Between these members extend axles 224, 226 and 228, each having sprocket gears over which are entrained endless chains 230, these chains carrying suitable transversely disposed risers 232 whereby the rocks discharged thereon may be elevated upwardly and discharged to the right of the device, as shown in Figure 4. One of the shafts, such as that at 224, may be driven, as by a belt 234, from the previously mentioned pulley wheel 134.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact constructions shown and described, but all suitable modifications and equivalents may be resorted to, falling within the scope of the appended claims.

Having disclosed and described the invention, what is claimed as new is as follows:

1. A rock picker comprising a portable supporting frame, an inclined track on said frame including horizontal rails connected by intermediate inclined rails, a rake assembly oscillatable and slidable upon said track, means operatively connecting said rake assemblies and said frame and reciprocating said rake assembly on said track, means operatively connected to said reciprocating means rotating said rake into loading position and into dumping position, said reciprocating means including a crank journaled on said frame and means connecting the crank to said rake assembly, means operatively associated with said frame rotating said crank.

2. A rock picker comprising a portable supporting frame, an inclined track on said frame including horizontal rails connected by intermediate inclined rails, a rake assembly oscillatable and slidable upon said track, means operatively connecting said rake assembly and said frame and reciprocating said rake assembly on said track, means operatively connected to said reciprocating means rotating said rake into loading position and into dumping position, said reciprocating means including a crank journaled on said frame and means connecting the crank to said rake assembly, means operatively associated with said frame rotating said crank, said rake assembly including an axle, a lever on said axle, said connecting means being secured to said lever.

3. A rock picker comprising a portable supporting frame, an inclined track on said frame including horizontal rails connected by intermediate inclined rails, a rake assembly oscillatable and slidable upon said track, means operatively connecting said rake assembly and said frame and reciprocating said rake assembly on said track, means operatively connected to said reciprocating means rotating said rake into loading position and into dumping position, a latch on said rake assembly securing said rake assembly in dumping position and means releasing said latch, said reciprocating means including crank means journalled on said frame, said latch engaging said crank means and securing said rake assembly in dumping position.

4. A rock picker comprising a portable supporting frame, an inclined track on said frame including horizontal rails connected by intermediate inclined rails, a rake assembly oscillatable and slidable upon said track, means operatively connecting said rake assembly and said frame and reciprocating said rake assembly on said track, means operatively connected to said reciprocating means rotating said rake into loading position and into dumping position, a latch on said rake assembly securing said rake assembly in dumping position, and means releasing said latch including a latch trip disposed against the bottom end of said track.

5. A rock picker comprising a portable supporting frame, an inclined track on said frame including horizontal rails connected by intermediate inclined rails, a rake assembly oscillatable and slidable upon said track, means operatively connecting said rake assembly and said frame and reciprocating said rake assembly on said track, means operatively connected to said reciprocating means rotating said rake into loading position and into dumping position, said inclined track having a sled pivoted to its lower end, a portion of said horizontal rails being mounted on said sled and forming continuations of said inclined tracks.

6. A rock picker comprising a portable supporting frame, an inclined track on said frame including upper horizontal rails connected by downwardly inclined rails, a sled pivoted to the lower end of saidi nclined track and having lower horizontal rails thereon forming continuations of said inclined rails, a rake assembly oscillatable and slidable upon said horizontal and inclined rails between a loading station on the lower horizontal rails and a dumping station on the upper horizontal rails, operating means on said frame reciprocating and rotating said rake assembly, said operating means maintaining said rake in loaded position during its travel to the dumping station and rotating said rake into dumping position at said dumping station upon initiation of return movement.

7. A rock picker comprising a portable supporting frame, an inclined track on said frame including upper horizontal rails connected by downwardly inclined rails, a sled pivoted to the lower end of said inclined track and having lower horizontal rails thereon forming continuations of said inclined rails, a rake assembly oscillatable and slidable upon said horizontal and inclined rails between a loading station on the lower horizontal rails and a dumping station on the upper horizontal rails, operating means on said frame reciprocating and rotating said rake assembly, said operating means maintaining said rake in loaded position during its travel to the dumping station and rotating said rake into dumping position at said dumping station upon intitiation of return movement, latch means on said rake assembly locking said rake in dumping position at said dumping station and means at said loading station releasing said latch means.

8. A rock picker comprising a portable supporting frame, an inclined track on said frame including horizontal rails connected by intermediate inclined rails, a rake assembly oscillatable and slidable upon said track, means operatively connecting said rake and said frame reciprocating said rake on said track, means operatively associated with said connecting means rotating said rake into loading position and into dumping position, means slidably retaining said rake assembly on said track, said retaining means comprising a sleeve rotatably mounted on said rake assembly, a finger on said sleeve engaging said track.

9. A rock picker comprising a portable supporting frame, an inclined track on said frame including upper and lower horizontal rails connected by intermediate inclined rails, a rake assembly oscillatable and slidable upon said track, means operatively connecting said rake and said frame, said rake on said track, means operatively associated with said connecting means rotating said rake into loading position and into dumping position, said inclined track having a sled pivoted to its lower end and said lower horizontal rails being mounted on said sled and forming continuations of said inclined track, a latch on said rake assembly securing said rake in dumping position and means on said sled releasing said latch.

10. A rock picker comprising a portable supporting frame, an inclined track on said frame including upper and lower horizontal rails connected by intermediate inclined rails, a rake assembly oscillatable and slidable upon said track, means operatively connecting said rake and said frame reciprocating said rake on said track, means operatively associated with said connecting means rotating said rake into loading position and into dumping position, said inclined track having a sled pivoted to its lower end, said lower horizontal rails being mounted on said sled and forming continuations of said inclined track, means operatively associated with said frame pivotally raising and lowering said track.

11. A rock picker comprising a portable supporting frame, an inclined track on said frame including upper and lower horizontal rails connected by intermediate inclined rails, a rake assembly oscillatable and slidable upon said track, means operatively connecting said rake and said frame reciprocating said rake on said track, means operatively associated with said connecting means rotating said rake into loading position and into dumping position, said inclined track having a sled pivoted to its lower end, said lower horizontal rails being mounted on said sled and forming continuations of said inclined track, said inclined track being disposed at the rear of said frame, and including a dumping station between said sled and said frame.

12. A rock picker comprising a portable supporting frame, an inclined track on said frame including upper and lower horizontal rails connected by intermediate inclined rails, a rake assembly oscillatable and slidable upon said track, means operatively connecting said rake and said frame reciprocating said rake on said track.

means operatively associated with said connecting means rotating said rake into loading position and into dumping position, said inclined track having a sled pivoted to its lower end, said lower horizontal rails being mounted on said sled and forming continuations of said inclined track, a latch on said rake assembly securing said rake in dumping position and means on said sled releasing said latch and reciprocating means including a crank journaled on said frame, means rotating said crank, means connecting said crank to said rake assembly, said latch engaging said connecting means to secure said rake in dumping position.

13. A rock picker comprising a portable supporting frame, an inclined track on said frame including upper and lower horizontal rails connected by intermediate inclined rails, a rake assembly oscillatable and slidable upon said track, means operatively connecting said rake and said frame reciprocating said rake on said track, means operatively associated with said connecting means rotating said rake into loading position and into dumping position, said inclined track having a sled pivoted to its lower end, said lower horizontal rails being mounted on said sled forming continuations of said inclined track, a latch on said rake assembly securing said rake in dumping position and means on said sled releasing said latch, said reciprocating means including a crank journaled on said frame, means on said frame rotating said crank, means connecting said crank to said rake assembly, said latch engaging said connecting means to secure said rake in dumping position, said latch releasing means including a latch trip mounted on said sled adjacent the bottom of said track.

RAY O. SCHRUM.

References Cited in the file of this patent

UNITED STATES PATENTS

| Number | Name | Date |
|---|---|---|
| 830,292 | Bernhard | Sept. 4, 1906 |
| 1,189,443 | Greenleaf | July 4, 1916 |
| 1,340,345 | Price | May 18, 1920 |
| 1,492,419 | Brackett | Apr. 29, 1924 |
| 1,524,734 | Douglass | Feb. 3, 1925 |
| 1,541,533 | Smith | June 9, 1925 |
| 2,093,148 | Hoofnagle et al. | Sept. 14, 1937 |
| 2,230,523 | Byhre | Feb. 4, 1941 |
| 2,344,246 | Grubich | Mar. 14, 1944 |
| 2,392,557 | Smith et al. | Jan. 8, 1946 |